(12) United States Patent
Mesner

(10) Patent No.: US 8,851,444 B2
(45) Date of Patent: Oct. 7, 2014

(54) PUMP FLOW RESTRICTING DEVICE

(75) Inventor: Steven Mesner, Tomah, WI (US)

(73) Assignee: Parker-Hannifin Corporation, Cleveland, OH (US)

( * ) Notice: Subject to any disclaimer, the term of this patent is extended or adjusted under 35 U.S.C. 154(b) by 589 days.

(21) Appl. No.: 13/264,420

(22) PCT Filed: Feb. 23, 2010

(86) PCT No.: PCT/US2010/025016
§ 371 (c)(1),
(2), (4) Date: Oct. 14, 2011

(87) PCT Pub. No.: WO2010/099095
PCT Pub. Date: Sep. 2, 2010

(65) Prior Publication Data
US 2012/0055566 A1 Mar. 8, 2012

Related U.S. Application Data

(60) Provisional application No. 61/156,008, filed on Feb. 27, 2009.

(51) Int. Cl.
F16K 31/383 (2006.01)
F16K 31/40 (2006.01)

(52) U.S. Cl.
CPC .................................. F16K 31/406 (2013.01)
USPC .............................. 251/30.05; 138/45; 251/51

(58) Field of Classification Search
CPC ..... F16K 31/406; F16K 31/38; G05D 7/0133; G05D 7/0126

USPC ................ 138/31, 41, 43, 45, 46; 251/30.01, 251/30.02, 30.05, 33, 35, 51, 55
See application file for complete search history.

(56) References Cited

U.S. PATENT DOCUMENTS

| | | | |
|---|---|---|---|
| 631,146 A * | 8/1899 | Batchelor, J. F. .......... | 251/30.01 |
| 1,798,973 A * | 3/1931 | Cordier ...................... | 251/30.01 |
| 2,728,355 A * | 12/1955 | Dahl .............................. | 138/45 |
| 2,853,986 A * | 9/1958 | Kolbe ........................... | 123/574 |
| 2,893,680 A * | 7/1959 | Freund ...................... | 251/30.02 |
| 2,960,109 A * | 11/1960 | Wilson ......................... | 137/517 |
| 3,151,628 A * | 10/1964 | Heckert ....................... | 137/500 |
| 3,250,294 A * | 5/1966 | Hipple ......................... | 137/528 |
| 3,308,798 A * | 3/1967 | Snider ......................... | 123/572 |
| 3,409,050 A * | 11/1968 | Weese ............................ | 138/45 |
| 3,503,417 A * | 3/1970 | Toda Tadahide et al. ..... | 137/480 |
| 3,581,721 A * | 6/1971 | Horiuchi ...................... | 123/574 |
| 4,056,085 A * | 11/1977 | Nowroski et al. ............. | 123/574 |
| 4,206,901 A * | 6/1980 | Williams ........................ | 251/35 |
| 4,383,550 A * | 5/1983 | Sotokazu ..................... | 137/517 |
| 4,429,708 A * | 2/1984 | Strueh ..................... | 137/115.08 |
| 4,478,245 A * | 10/1984 | Bender ......................... | 137/554 |
| 4,553,732 A * | 11/1985 | Brundage et al. .......... | 251/30.01 |
| 4,708,166 A * | 11/1987 | Kobold ...................... | 137/512.1 |
| 4,936,541 A * | 6/1990 | Oksanen et al. ........... | 251/30.04 |

(Continued)

Primary Examiner — Stephen M Hepperle
Assistant Examiner — Frederick D Soski
(74) Attorney, Agent, or Firm — Thomas G. Fistek

(57) ABSTRACT

A restrictor mechanism is provided in a pilot operated solenoid valve that restricts the pilot flow to the actuating piston of the valve if the pressure differences within the valve are great. This reduces the actuating forces allowing the valve to open or close softly. As the pressures within the valve start to balance, the restrictor device opens, allowing full pilot flow to hold the valve in position.

17 Claims, 4 Drawing Sheets

(56) References Cited

U.S. PATENT DOCUMENTS

| | | | |
|---|---|---|---|
| 5,022,438 A * | 6/1991 | Faraon-Chaul | 138/42 |
| 5,102,095 A * | 4/1992 | Schmitt-Matzen et al. | 251/117 |
| 5,634,491 A * | 6/1997 | Benedict | 137/504 |
| 6,427,714 B2 * | 8/2002 | Freigang et al. | 137/225 |
| 6,698,455 B2 * | 3/2004 | Ramirez-Rivera | 138/44 |
| 6,877,714 B2 * | 4/2005 | Hall | 251/45 |
| 2008/0029722 A1 * | 2/2008 | Irwin | 251/45 |

* cited by examiner

PUMP FLOW RESTRICTING DEVICE

CROSS-REFERENCE TO RELATED CASES

The present application is a national stage application of International Patent Application No. PCT/US2010/025016, filed on Feb. 2, 2010, which claims the benefit of U.S. Provisional Application Ser. No. 61/156,008; filed Feb. 27, 2009, the disclosure of which is expressly incorporated herein by reference.

FIELD OF INVENTION

The present invention relates to a pilot flow restricting device for a pilot operated valve such as the type used in industrial refrigeration valves.

BACKGROUND OF THE INVENTION

Many valves used in industrial refrigeration are pilot operated. Pilot operated valves function by applying pressure to a piston in the valve which either pushes the valve open or shut. As long as the pressure is maintained on the piston the valve stays in the open or shut position. The source of the pilot gas or liquid can be either from the line in which the valve is installed, or an external source. The supply of the pilot gas or liquid is typically controlled by a smaller solenoid valve which is either in an on or off state, allowing pilot flow to the piston or not.

Often times, when the valve is first activated the forces used to actuate the valve are by far greater than those restricting the movement of the valve. This is because the pressure of the pilot gas or liquid used to actuate the valve is much greater than the pressure of the liquid or gas restricting the movement of the valve. It is not uncommon for there to be as much as 200 psi difference between the two. This high pressure difference across the valve, coupled with the difference in size between the large actuating piston, and the smaller size of the plug which the restricting pressures act upon causes the valve to either slam shut or fly open with great force. Valves opening and closing with a large amount of force causes pipes and hangers to shake violently. This places large amounts of stress on the piping system and supporting structures. End users do many different things to prevent this, added bracing, and special sequencing of the pilot source gas to name a few.

This force can be controlled by restricting the amount of pilot gas or liquid which is applied to the actuating piston with a fixed orifice. This technique works for the initial movement of the valve, but the problem arises after the pressures start to balance within the valve. Typically, valves are required to stay open or shut with as little as 2-5 psi difference within the valve. By restricting the pilot flow to slow the initial closing there is not enough sustained pilot flow to hold the valve open or closed after the pressures start to balance.

SUMMARY OF THE INVENTION

At least one advantage is provided by a pilot operated valve assembly comprising: a valve housing including an inlet port having an inlet passageway and an outlet port having an outlet passageway separated by an aperture forming a valve port, the valve housing having a cylindrical bore; a valve piston reciprocally moveable within the bore and coupled to a valve member operable to open and close the valve port; an adapter plate attached to an open bore end of the housing; a pilot passageway extending through the housing and the adapter plate and fluidly connecting the inlet passageway to the open bore end of the housing; a solenoid operable to open and close the pilot passageway; and a restrictor mechanism operable to selectively restrict flow through the pilot passageway based on the difference in fluid pressure on either side of the restrictor mechanism.

At least one advantage is provided by a pilot operated valve assembly comprising: a valve housing including an inlet port having an inlet passageway and an outlet port having an outlet passageway separated by an aperture forming a valve port, the valve housing having a cylindrical bore; a valve piston reciprocally moveable within the bore and coupled to a valve member operable to open and close the valve port; an adapter plate attached to an open bore end of the housing; a pilot passageway extending through the housing and the adapter plate and fluidly connecting the inlet passageway to the open bore end of the housing; a solenoid operable to open and close the pilot passageway; and a restrictor mechanism comprising a restrictor piston having a piston orifice therethrough, and a biasing member biasing the restrictor piston toward a first position allowing full flow from the pilot passageway to the open bore end of the housing, the restrictor piston moveable to a second position wherein the piston blocks all flow from the pilot passageway to the open bore end of the housing except for flow through the piston orifice.

At least one advantage over the prior art is provided by a pilot operated valve assembly comprising: a valve housing including an inlet port having an inlet passageway and an outlet port having an outlet passageway separated by an aperture forming a valve port, the valve housing having a cylindrical bore; a valve piston reciprocally moveable within the bore and coupled to a valve member operable to open and close the valve port; an adapter plate attached to an open bore end of the housing; a pilot passageway extending through the housing and the adapter plate and fluidly connecting the inlet passageway to the open bore end of the housing; a solenoid operable to open and close the pilot passageway; and a restrictor mechanism positioned at least partially within the pilot passageway; the restrictor mechanism comprising a cartridge having an internal chamber and a cartridge orifice, the internal chamber in fluid connection with the cartridge orifice, a restrictor piston movable within the chamber, the restrictor piston having a piston orifice therethrough, and a biasing member biasing the restrictor piston away from the cartridge orifice to provide unrestricted flow through the pilot passageway to the chamber above the valve piston, wherein the restrictor piston is moveable under pressure toward the cartridge orifice where the piston orifice provides the only passageway through the restrictor mechanism.

BRIEF DESCRIPTION OF THE DRAWINGS

Embodiments of this invention will now be described in further detail with reference to the accompanying drawings, in which.

DETAILED DESCRIPTION OF THE INVENTION

Figure 1:
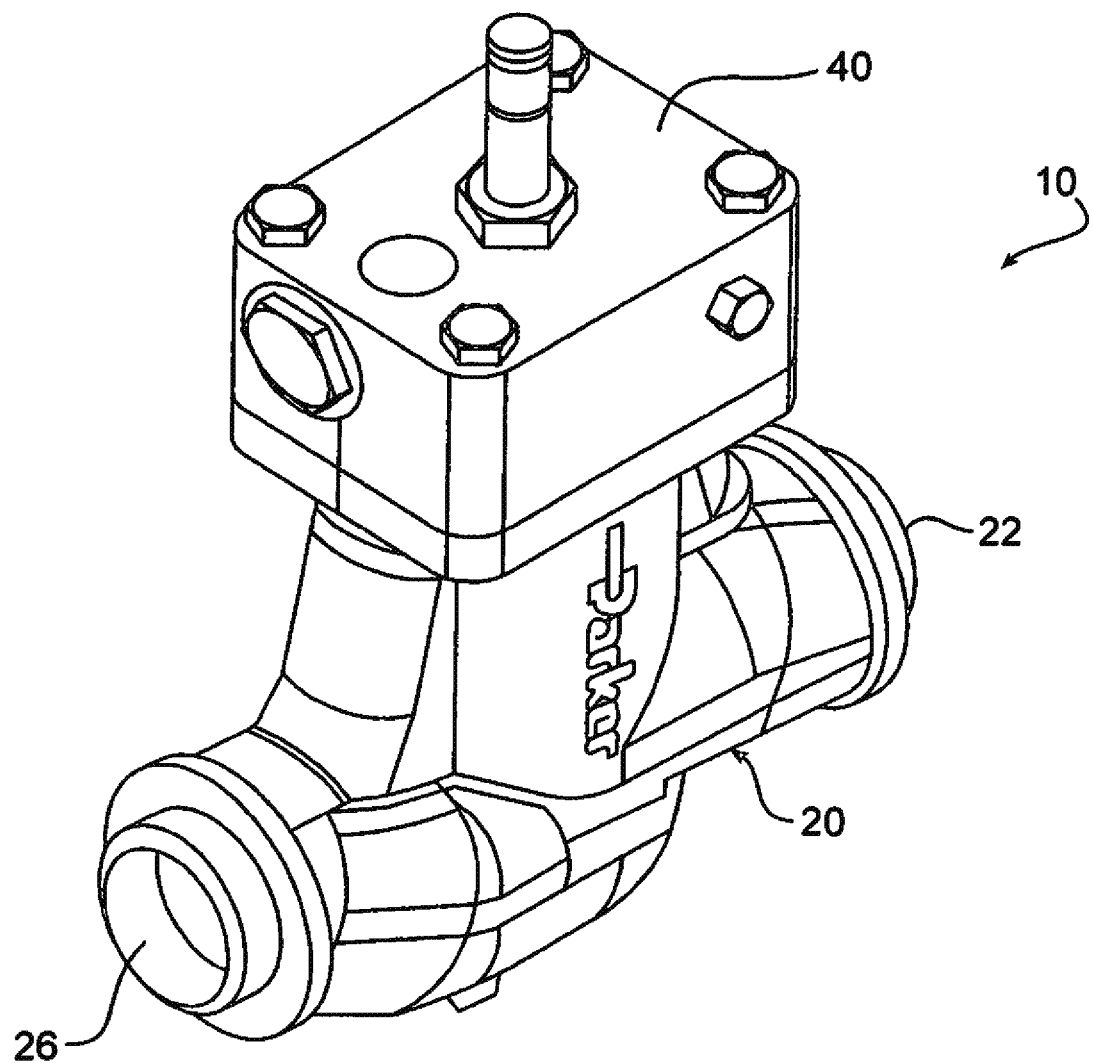
FIG. 1 is a perspective view of an embodiment of the pilot operated valve assembly of the present invention.
Figure 2:
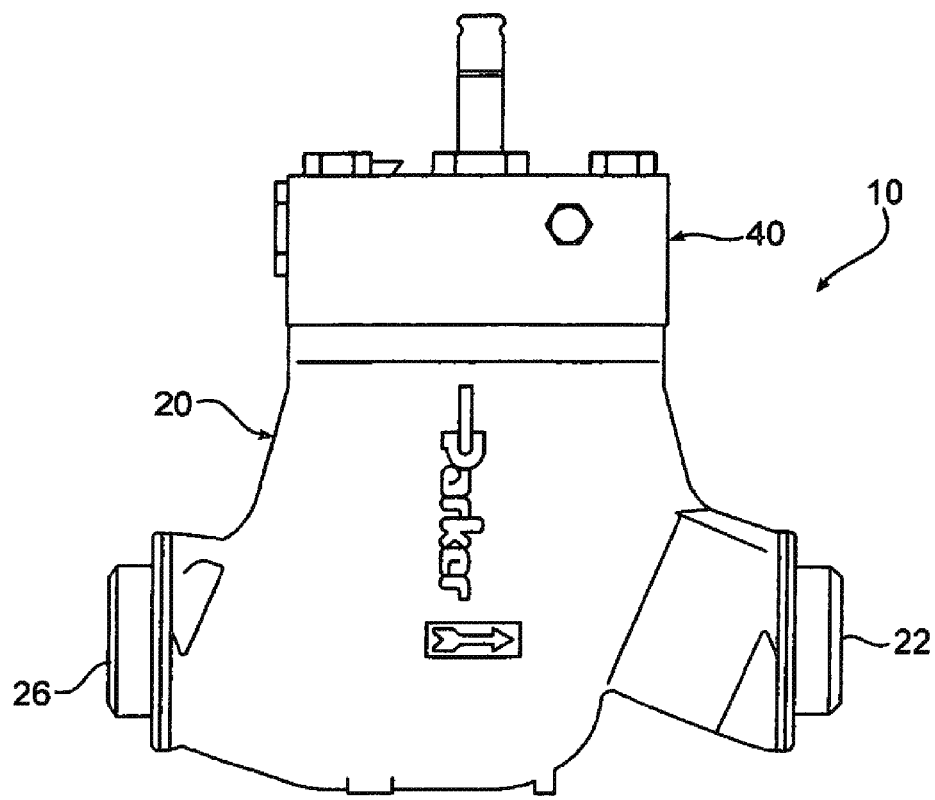
FIG. 2 is a front elevational view of the valve shown in FIG. 1.
Figure 3:
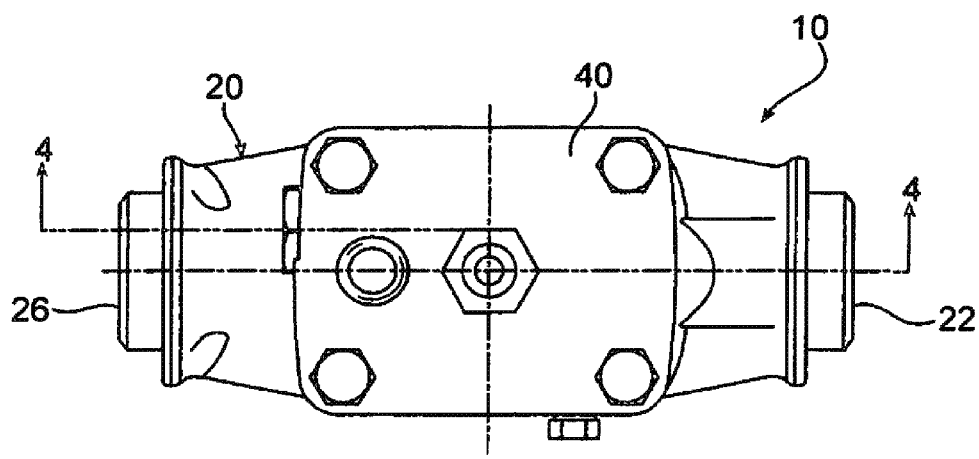
FIG. 3 is a top elevational view of the valve shown in FIG. 1.
Figure 4:
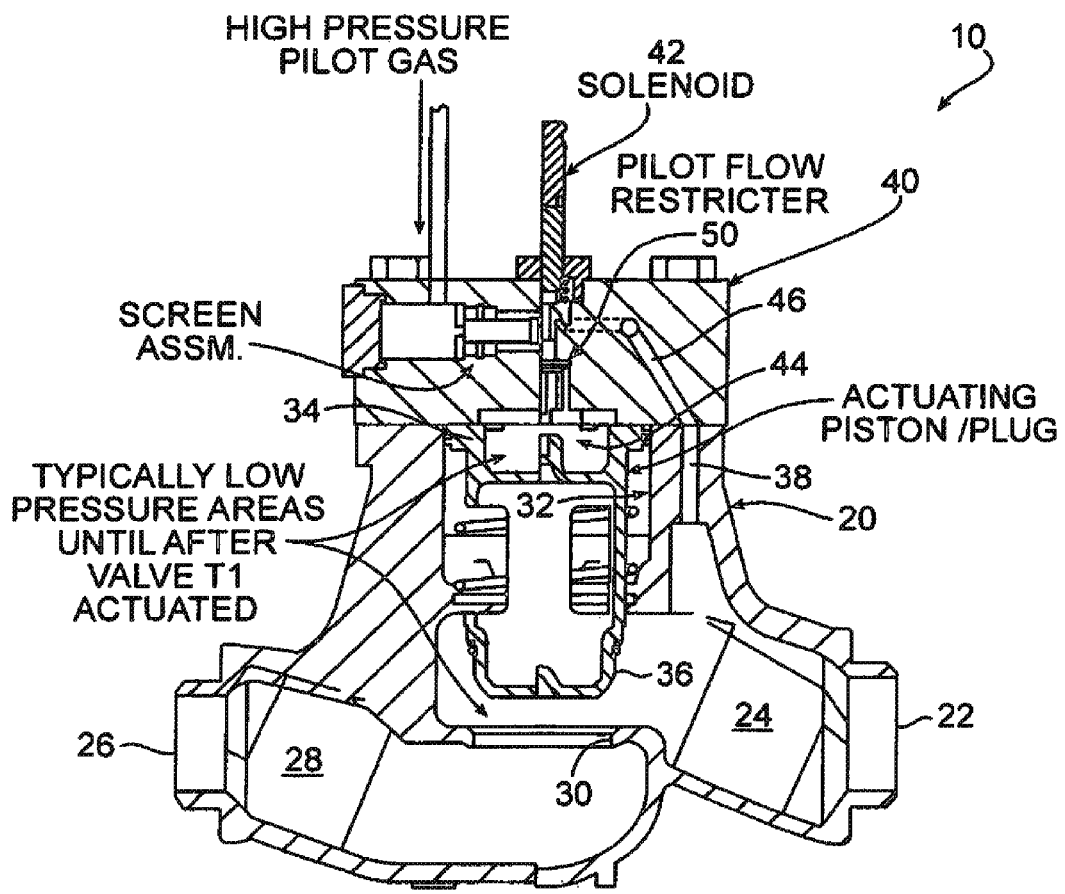
FIG. 4 is a cross-sectional view of the pilot operated valve assembly of FIG. 1 taken along the section line shown in FIG. 3.

Referring now to FIGS. 1-4, an embodiment of a pilot operated valve assembly 10 is shown. The valve assembly 10 comprises a valve housing 20 including an inlet port 22 having an inlet passageway 24 and an outlet port 26 having an outlet passageway 28 separated by an aperture 30 forming a valve port. The valve housing 20 has a cylindrical bore 32 in which a valve piston 34 reciprocally moveable within the bore 32 and coupled to a valve member 36 operable to open and close the valve port 30. The valve assembly 10 further includes an adapter plate 40 attached to the open bore end of the valve housing 20. A housing pilot bore 38 is formed in and extending through the valve housing 20 and fluidly connected to an adapter pilot passageway 46 in the adapter which in combination provides a pilot passageway which fluidly connects the inlet passageway 24 to a chamber 44 above the valve piston 34.

The adapter plate 40 includes a solenoid 42 mounted thereon operable to open and close the pilot passageway and thereby fluidly connect and disconnect the chamber 44 above the valve piston 34 to the pilot bore 38 of the valve housing 20. The valve assembly 10 includes a restrictor mechanism 50 positioned at least partially within the adapter pilot passageway 46.

Figure 5:
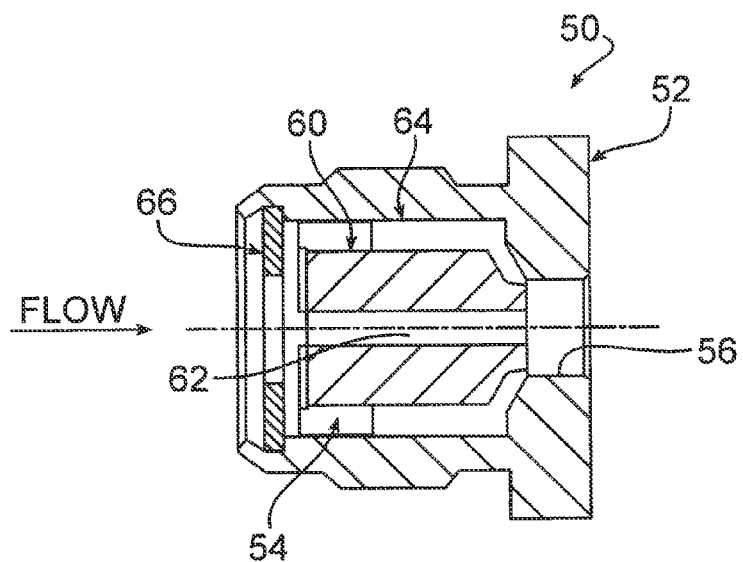
FIG. 5 is a detailed cross-sectional view of a restrictor mechanism of the valve shown in FIG. 4.
Figure 6:
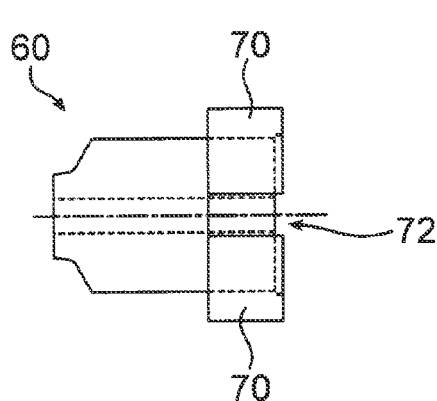
FIG. 6 is a side view of the piston of the restrictor mechanism shown in FIG. 5.
Figure 7:
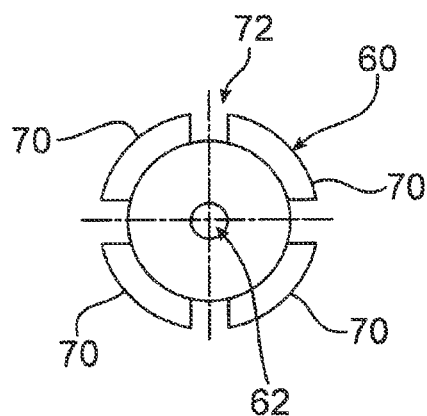
FIG. 7 is an end view of the piston shown in FIG. 6.

Referring now to FIGS. 5-7, the mechanism 50 comprises a cartridge 52 having an internal chamber 54 and a cartridge orifice 56. The cartridge orifice 56 may be generally the same diameter of the pilot passageway 46, but the invention is not limited to such a configuration. The internal chamber 54 is in fluid connection with the cartridge orifice 56. The mechanism 50 also includes a restrictor piston 60 movable within the internal chamber 54. The restrictor piston 60 having a peripheral outer surface that is substantially cylindrical and also having a piston orifice 62 formed therethrough. In one embodiment, the cartridge orifice 56 is generally eight times larger than the orifice 62 in the restrictor piston 60, however, the invention is not limited to a particular size comparison.

The piston includes a plurality of radially outwardly extending fin portions 70 which engage the walls of the internal chamber 54. A biasing member 64 biases the restrictor piston 60 away from the cartridge orifice 56 to allow unrestricted flow through the large gaps 72 between the portions 70 of the restrictor piston (in addition to flow through the piston orifice 62) through the pilot passageway 46 to the chamber 44 above the valve piston 34. The biasing member 64 and restrictor piston 60 are retained in the internal chamber 54 by a retainer 66. The restrictor piston 60 is moveable under pressure away from retainer 66 toward the cartridge orifice 56 where the piston orifice 62 provides the only passageway through the restrictor mechanism 50.

In operation, as the high pressure pilot gas or liquid comes into the cartridge 52 of the restrictor mechanism 50, the biasing spring 64 is over come pushing the restrictor piston 60 to a closed position against the cartridge orifice 56. Flow is restricted to the small piston orifice 62 through the center of the restrictor piston 60 allowing a limited amount of pilot flow to the chamber 44 above the valve piston 34. As the pressure on the valve piston 34 and the bottom of the restrictor piston 60 starts to balance with the pilot flow pressure the biasing spring 64 can now push the restrictor piston 60 to the open position away from the cartridge orifice 56. This allows for full pilot flow around the restrictor piston 60. The valve will now stay in position at the small pressure differences required.

Accordingly, the restrictor mechanism 50 restricts the pilot flow to the actuating piston 34 if the pressure differences within the valve 10 are great. This reduces the actuating forces allowing the valve 10 to open or close softly. Then, as the pressures within the valve 10 starts to balance the device opens allowing full pilot flow to hold the valve in position. If the initial pressure differences in the valve are small, the pilot flow will not overcome the spring biasing force on the restrictor piston. The restrictor piston 60 will stay in the open position allowing full pilot flow to the piston 34. This is acceptable because the small pressure differences will cause the valve 10 to activate softly on its own, and full pilot will be required to actuate the valve 10.

The valve assembly has been described with reference to the foregoing description, figures, and embodiments. It is appreciated that modifications may occur to persons skilled in the art upon reading and understanding the specification and drawings. It is intended that the inventive subject matter be considered as including all such modifications insofar as they come within the scope of the appended claims or equivalents thereof.

What is claimed is:

1. A pilot operated valve assembly comprising:
   a valve housing including an inlet port having an inlet passageway and an outlet port having an outlet passageway separated by an aperture forming a valve port, the valve housing having a cylindrical bore;
   a valve piston reciprocally moveable within the bore and coupled to a valve member operable to open and close the valve port;
   an adapter plate attached to an open bore end of the housing;
   a pilot passageway extending through the housing and the adapter plate and fluidly connecting the inlet passageway to the open bore end of the housing;
   a solenoid operable to open and close the pilot passageway; and
   a restrictor mechanism operable to selectively restrict flow through the pilot passageway based on the difference in fluid pressure on either side of the restrictor mechanism, wherein the restrictor mechanism comprises a restrictor piston having a piston orifice therethrough, and a biasing member biasing the restrictor piston toward a first position allowing full flow from the pilot passageway to the open bore end of the housing, the restrictor piston moveable to a second position wherein the piston blocks all flow from the pilot passageway to the open bore end of the housing except for flow through the piston orifice.

2. The valve of claim 1, wherein the restrictor mechanism further comprises a cartridge at least partially positioned in the pilot passageway, the cartridge having an internal chamber and a cartridge orifice, the internal chamber in fluid connection with the cartridge orifice, the restrictor piston movable within the chamber, and the biasing member biasing the restrictor piston away from the cartridge orifice to provide unrestricted flow through the pilot passageway to the chamber above the valve piston, wherein the restrictor piston is moveable under pressure toward the cartridge orifice where the piston orifice provides the only passageway through the restrictor mechanism.

3. The valve of claim 2, wherein the cartridge orifice is generally the same diameter as the pilot passageway.

4. The valve of claim 2, wherein the cartridge orifice is generally eight times larger than the orifice in the restrictor piston.

5. The valve of claim 2, wherein a peripheral outer surface of the restrictor piston is substantially cylindrical.

6. The valve of claim 5, wherein the peripheral outer surface of the restrictor piston includes a plurality of peripherally spaced axial flutes.

7. A pilot operated valve assembly comprising:
a valve housing including an inlet port having an inlet passageway and an outlet port having an outlet passageway separated by an aperture forming a valve port, the valve housing having a cylindrical bore;
a valve piston reciprocally moveable within the bore and coupled to a valve member operable to open and close the valve port;
an adapter plate attached to an open bore end of the housing;
a pilot passageway extending through the housing and the adapter plate and fluidly connecting the inlet passageway to the open bore end of the housing;
a solenoid operable to open and close the pilot passageway; and
a restrictor mechanism comprising a restrictor piston having a piston orifice therethrough, and a biasing member biasing the restrictor piston toward a first position allowing full flow from the pilot passageway to the open bore end of the housing, the restrictor piston moveable to a second position wherein the piston blocks all flow from the pilot passageway to the open bore end of the housing except for flow through the piston orifice.

8. The valve of claim 7, wherein the restrictor mechanism further comprises a cartridge at least partially positioned in the pilot passageway, the cartridge having an internal chamber and a cartridge orifice, the internal chamber in fluid connection with the cartridge orifice, the restrictor piston movable within the chamber, and the biasing member biasing the restrictor piston away from the cartridge orifice to provide unrestricted flow through the pilot passageway to the chamber above the valve piston, wherein the restrictor piston is moveable under pressure toward the cartridge orifice where the piston orifice provides the only passageway through the restrictor mechanism.

9. The valve of claim 8, wherein the cartridge orifice is generally the same diameter as the pilot passageway.

10. The valve of claim 8, wherein the cartridge orifice is generally eight times larger than the orifice in the restrictor piston.

11. The valve of claim 8, wherein a peripheral outer surface of the restrictor piston is substantially cylindrical.

12. The valve of claim 11, wherein the peripheral outer surface of the restrictor piston includes a plurality of peripherally spaced axial flutes.

13. A pilot operated valve assembly comprising:
a valve housing including an inlet port having an inlet passageway and an outlet port having an outlet passageway separated by an aperture forming a valve port, the valve housing having a cylindrical bore;
a valve piston reciprocally moveable within the bore and coupled to a valve member operable to open and close the valve port;
an adapter plate attached to an open bore end of the housing;
a pilot passageway extending through the housing and the adapter plate and fluidly connecting the inlet passageway to the open bore end of the housing;
a solenoid operable to open and close the pilot passageway; and
a restrictor mechanism positioned at least partially within the pilot passageway;
the restrictor mechanism comprising a cartridge having an internal chamber and a cartridge orifice, the internal chamber in fluid connection with the cartridge orifice, a restrictor piston movable within the chamber, the restrictor piston having a piston orifice therethrough, and a biasing member biasing the restrictor piston away from the cartridge orifice to provide unrestricted flow through the pilot passageway to the chamber above the valve piston, wherein the restrictor piston is moveable under pressure toward the cartridge orifice where the piston orifice provides the only passageway through the restrictor mechanism.

14. The valve of claim 13, wherein the cartridge orifice is generally the same diameter as the pilot passageway.

15. The valve of claim 13, wherein the cartridge orifice is generally eight times larger than the orifice in the restrictor piston.

16. The valve of claim 13, wherein a peripheral outer surface of the restrictor piston is substantially cylindrical.

17. The valve of claim 13, wherein the peripheral outer surface of the restrictor piston includes a plurality of peripherally spaced axial flutes.

* * * * *